Jan. 12, 1971      J. E. ELLIS      3,553,879
SEINE TOW BAR

Filed June 18, 1969      2 Sheets-Sheet 1

INVENTOR
JAMES E. ELLIS
BY
ATTORNEY

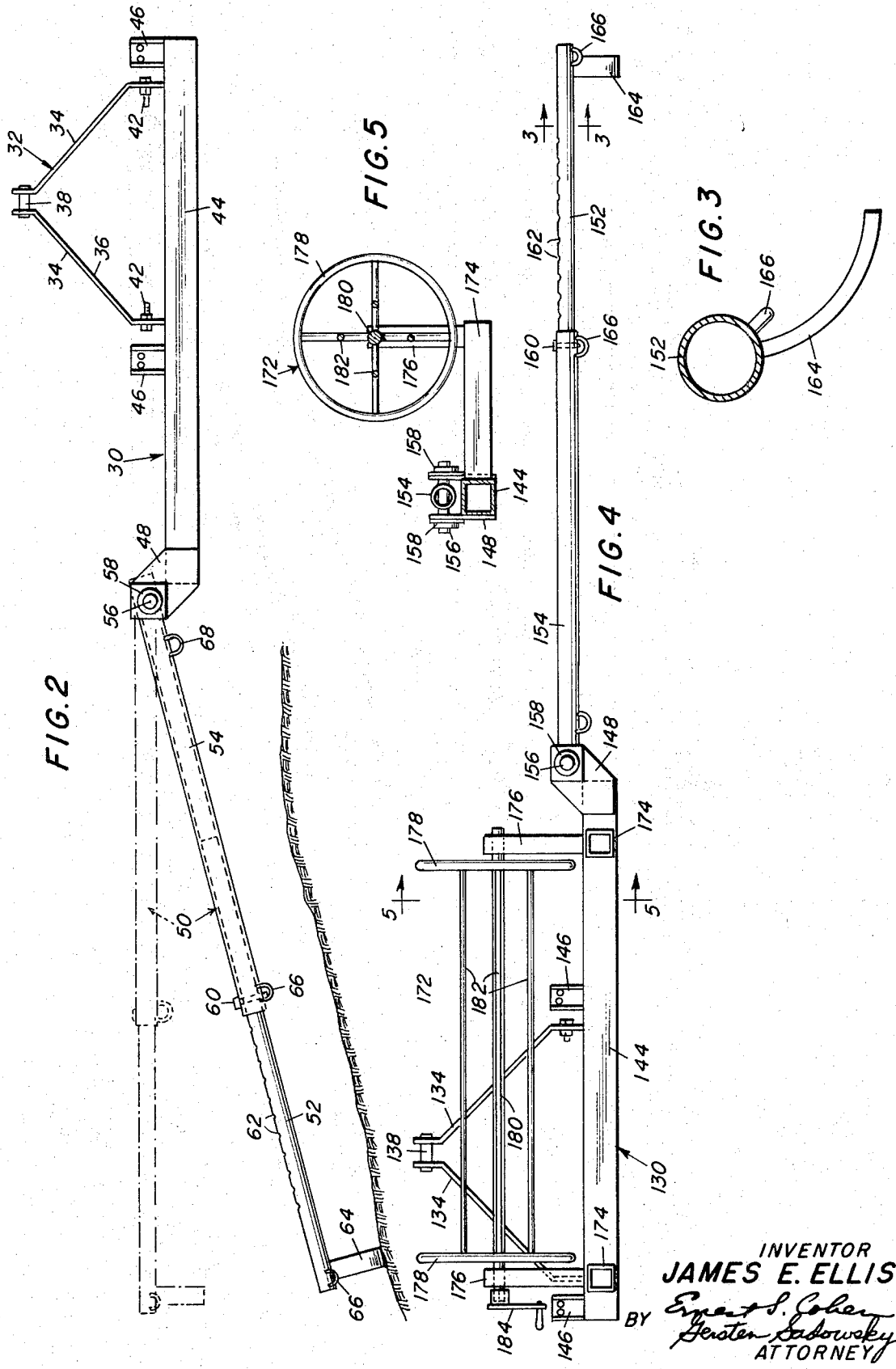

United States Patent Office 3,553,879
Patented Jan. 12, 1971

3,553,879
SEINE TOW BAR
James E. Ellis, Ann Arbor, Mich., assignor to the United States of America as represented by the Secretary of the Interior
Filed June 18, 1969, Ser. No. 834,254
Int. Cl. A01k 73/12
U.S. Cl. 43—8           4 Claims

ABSTRACT OF THE DISCLOSURE

A pair of tow bars are used for drawing a seine behind a pair of tractors for harvesting fish in a farm fishpond. Each tow bar has a tractor mounting hitch and a pivoted arm to which a seine is attached. The pivoted arm rides upon the bottom of the pond on a skid. As the seine is drawn through the pond the arm pivots to follow the contour of the pond bottom so that the seine is maintained close to the bottom so that the seine is maintained close to the bottom and the escape of fish past the seine is prevented. One tow bar has a reel for storing the seine.

BACKGROUND OF THE INVENTION

This invention relates generally to net handling apparatus, and more particularly to a seine tow bar and storage reel for use with a land vehicle.

The fish swimming naturally in the oceans, lakes, and rivers of the world have long been considered a staple source of protein for human consumption. Since two-thirds of the surface of the world is covered by water, the natural habitat of fish abounds in all but the most arid regions. Fish are often found where the production of other protein foods is impractical or impossible. For this reason, fish and fish products are often the main sources of protein for the populations of underdeveloped countries.

Fish have been in relatively abundant supply because of the many bodies of water for their natural production. As the population of the world increases, the need for sources of fish to supplement natural production becomes increasingly apparent. The artificial farming of fish in small lakes and ponds effectively fills this need. By controlled stocking, feeding, and harvesting, artificial lakes and ponds transform previously unproductive lands into plentiful sources of fish for food. As the need for these artificially grown fish increases, new and better techniques of farming must be found.

Brave men in boats have plied the waterways of the world since time immemorial to harvest naturally growing fish for food. They have developed a detailed and comprehensive art for detecting and capturing their quarry. Since methods and apparatus have been developed by these fishermen for catching naturally growing fish, it would at first appear logical that the same methods and apparatus would be suitable for harvesting artificially cultured fish. In many instances, however, the previously used methods and apparatus are not suited to the harvesting of cultured fish.

Typically for catching fish, a boat has been used to draw a net through a body of water. The design of the apparatus for storing the net on the boat, and for towing the net through the water has been governed by the limitations of the boat, itself. Artifically grown fish are typically raised in small farm ponds where the operation of even a small boat for netting is unwieldy. As a consequence, the net handling methods and apparatus developed for use on boats have generally been abandoned by fish farmers, and they have operated their nets manually from the banks of their ponds. The present invention is designed to overcome the deficiencies of the apparatus of the prior art, and to decrease the labor involved in net handling in the artificial farming of food fish.

SUMMARY OF THE INVENTION

This invention is a seine tow bar for use in the harvesting of artificially cultured fish. The tow bar includes a three-point hitch for attachment to a tractor or other vehicle, and a pivoted extension arm for attachment to a seine or other form of net. The seine is tied between a pair of tow bars, which are mounted on tractors, and drawn through a fishpond for harvesting the fish within the pond. The pivoted extension arms, to which the ends of the net are secured, ride upon the bottom of the pond on skids which support the extension arms and maintain effective closure between the ends of the net and the bottom adjacent to the banks of the pond. On one of the tow bars there is a reel for storage of the seine.

It is, therefore, an object of this invention to provide a tow bar for drawing a net with a land vehicle.

Another object of this invention is to provide a seine tow bar which allows the ends of the seine to follow the contour of a pond bottom for maintaining effective closure.

Another object of this invention is to provide a seine tow bar which includes a reel for storing a seine when not in use.

These and other objects of this invention will become more apparent with reference to the following drawings in which:

FIG. 2 is a rear view of one embodiment of a seine tow bar.

FIG. 3 is a sectional view of an extension arm taken on line 3—3 of FIG. 4, illustrating the shape of the skid upon which the arm rides on the bottom of a pond.

FIG. 4 is a plan view of another embodiment of a seine tow bar, including a reel for storing a seine.

FIG. 5 is a sectional view of the seine storage reel, taken along lines 5—5 of FIG. 4.

DESCRIPTION OF THE PREFERRED EMBODIMENTS

Figure 1:
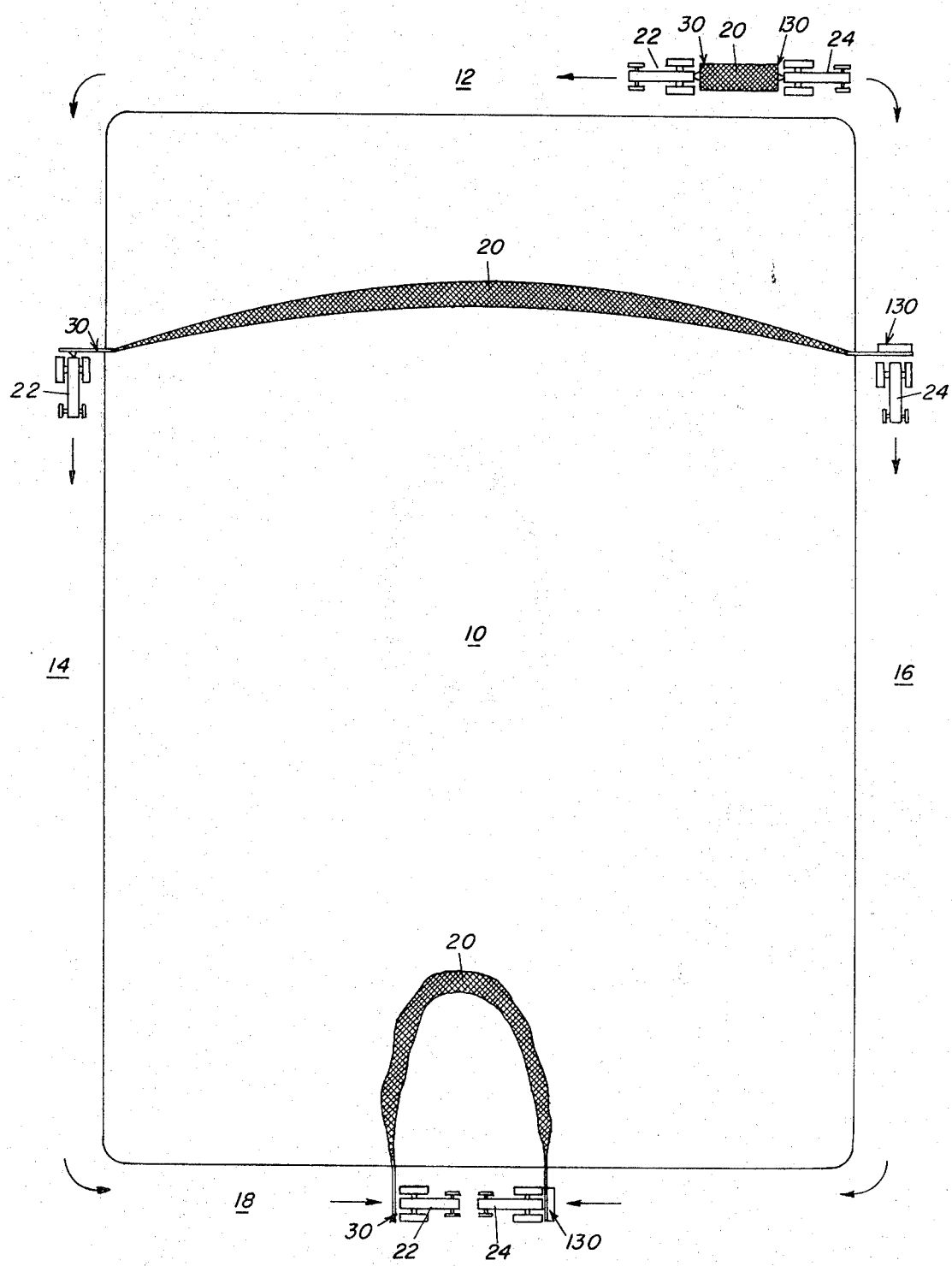
FIG. 1 is a plan view of a seining operation performed in a fishpond using the seine tow bar of this invention.

A fishpond 10 which is surrounded by earthen embankments 12–18 is shown in FIG. 1. For harvesting fish within the pond 10, a seine 20 is drawn from one end of the pond to the other by two tractors 22 and 24. The seine is connected to each of the tractors 22 and 24 by seine tow bars 30 and 130, respectively.

The seine tow bar 30 is shown in FIG. 2 in operating position upon the earthen embankment 14 of the pond 10. For the sake of clarity the tractor 22 is omitted from FIG. 2. The tow bar 30 includes a common three point hitch 32, an elongated chassis 44, and a telescoping extension arm 50. The seine tow bar is attached to the tractor 22 by the hitch 32, and the seine 20 is attached to the extension arm 50 of the tow bar.

The three point hitch 32 includes a pair of mutually inclined arms 34 which are each secured at one end to a side surface of the elongated chassis 44, forming a triangular framework 36. A horizontal pivot pin 38 extends between the adjacent closely spaced ends of the arms 34 at the apex of the framework 36 for attachment to a complementary hitching point (not shown) on the tractor 22. On each side of the base of the framework 36 there are holes for receiving bolts 40, which are inserted through hydraulically operated arms (not shown) on the tractor 22 and fastened for pivotal motion by nuts 42. By means of this three point hitch 32 the seine tow bar 30 is mechanically raised and lowered by the tractor operator.

Alternately, the tow bar is rigidly fixed to a tractor or other vehicle by spaced brackets 46 which are attached to the chassis 44 near the base of the framework 36.

A pair of spaced parallel plates 48 extend above and beyond one end of the chassis 44. The plates 48 are attached to opposite vertical sides of the chassis and form an open framework in which the telescoping extension arm 50 is attached. The extension arm 50 includes internal and external telescoping tubes 52 and 54. One end of the tube 54 is attached to the chassis 44 by a pivot pin 56 which rides in bearings 58 on the plates 48. The pivot pin 56 is mounted above and beyond the end of the chassis 44, allowing the extension arm 50 to swing in a 270° vertical arc, as partially shown by the fragmentary lines in FIG. 2. The internal telescoping tube 52 is inserted within the external tube 54 and fastened by a pin 60 which extends through the opposite walls of each tube. Spaced holes 62 along the length of the internal tube 52 facilitate adjustment of the length of the extension arm 50 for varying operating conditions.

In operation, the extension arm 50 is supported on the bottom of the pond 10 by a curved skid 64 on the end of internal tube 52, as best seen in FIGS. 2 and 3. The seine 20 is attached to U-shaped rings 66 which are mounted near the ends of the internal and external tubes 52 and 54 of extension arm 50. A third attachment ring 68 is mounted on the pivoted end of external tube 54. As the seine is drawn through the pond 10 behind the tractor 22, the extension arm and net travel up and down, following the contour of the fishpond bottom so that maximum netting efficiency is achieved. When not in use, the telescoping extension arm 50 is closed and rotated to a retracted position on top of the chassis 44.

The second seine tow bar 130, shown in FIG. 4, is essentially a mirror image of the tow bar 30 which is shown in FIG. 2. In addition, the seine tow bar 130 includes a seine storage reel 172. For convenience, the similar elements of each tow bar are similarly numeraled, with an additional digit (1) before the reference numeral of each element of the tow bar 130.

The storage reel 172 is mounted on the chassis 144 of tow bar 130 by pairs of parallel horizontal supports 174 and vertical supports 176. The storage reel includes an aligned pair of spoked wheels 178 which are fixed to an axle 180, as shown in FIGS. 4 and 5. Horizontal stringers 182 extend between the spokes of the spaced wheels 178 and provide a supporting structure upon which the seine 20 is rolled. The axle 180 is supported at each end for rotation in bearings (not shown) which are mounted within the vertical supports 176.

In operation, the seine 20 is loaded onto the storage reel by manually rotating a crank handle 184 which is fixed to the axle 180. Power loading of the seine could be implemented through the tractor power take-off (not shown), but manual loading is preferred. The two tractors 22 and 24 are then positioned back-to-back in alignment on the embankment 12 of the pond 10, as shown in FIG. 1. With the extension arm 50 of tow bar 30 in the retracted position the seine is attached to one ring 66 and to the third ring 68 on the tow bar 30 so that the seine can be unrolled in a straight line. The tractor 22 is then driven away from the tractor 24, unrolling the seine from the storage reel 172. When the seine has been unrolled, the extension arms of each tow bar are rotated from their retracted positions and extended. The seine is then attached to the spaced rings 66. Alternately, the extension arm 50 of the tow bar 30 on tractor 22 can be rotated from retracted position prior to unrolling the seine from the storage reel 172. The seine is then attached to the spaced rings 66 on the tow bar 30 and the tractor 22 driven away in alignment with the tractor 24. In this way the seine is drawn on an angle toward a convenient position near the pond 10.

The two tractors then proceed down the opposite embankments 14 and 16, drawing the seine through the water behind and to one side of them. When the embankment 18 is reached, each tractor turns toward the other, closing the seine and trapping the fish within it. Throughout this operation the skids 64 and 164 ride on the pond bottom, sealing the ends of the seine and preventing the escape of the harvested fish.

It is, therefore, apparent that useful devices have been provided for harvesting fish. In adapting the present exemplary disclosure to a specific vehicle or net, numerous modifications will become apparent to those skilled in the art. Additional bracing can be provided where the weight of the catch exceeds the limitations of the structure shown. Power operation of the reel can be provided. The chassis can be constructed with a pivot at each end for interchanging the extension arms, making the tow bars interchangeable for operation on either side of a pond.

These and other modifications of the invention will become apparent to those skilled in the art in the light of the above teachings and within the scope of the appended claims.

What is claimed is:

1. A net tow bar comprising:
   an elongated chassis,
   means for attaching the elongated chassis to a vehicle so that the length of the chassis extends in a direction substantially transverse to the normal direction of motion of the vehicle,
   an extension arm, pivoted at one end on the elongated chassis and extending substantially in the direction of the chassis for pivoted movement relative to the chassis in a substantially vertical plane,
   a skid mounted on the other end of the extension arm, and
   means for securing a net to the extension arm.

2. A net tow bar as claimed in claim 1 in which:
   the means for attaching includes a three-point tractor hitch, and
   the extension arm includes a series of telescoping sections for varying the length of the arm.

3. A net tow bar as claimed in claim 2, further comprising:
   a reel mounted on the elongated chassis for storing a net.

4. A net tow bar as claimed in claim 1 further comprising:
   a reel mounted on the elongated chassis for storing a net.

References Cited

UNITED STATES PATENTS

| | | | |
|---|---|---|---|
| 1,252,500 | 1/1918 | Schnoor | 119—5 |
| 1,304,302 | 5/1919 | Gage | 43—8 |
| 3,237,339 | 3/1966 | Rice | 119—3X |

WARNER H. CAMP, Primary Examiner

U.S. Cl. X.R.

43—14; 119—3